United States Patent [19]
Nagae et al.

[11] Patent Number: 5,495,732
[45] Date of Patent: Mar. 5, 1996

[54] STEERING LOCK APPARATUS

[75] Inventors: Kazuaki Nagae; Minoru Morikawa, both of Aichi, Japan

[73] Assignee: Kabushiki Kaisha Tokai Rika Denki Seisakusho, Aichi, Japan

[21] Appl. No.: 156,815

[22] Filed: Nov. 24, 1993

[30] Foreign Application Priority Data

Nov. 25, 1992 [JP] Japan .................................. 4-314939

[51] Int. Cl.$^6$ .................................................. B60R 25/02
[52] U.S. Cl. ................................................ 70/252; 70/186
[58] Field of Search ..................... 70/422, 252, 182–186, 70/245, 246, DIG. 6

[56] References Cited

U.S. PATENT DOCUMENTS

| | | |
|---|---|---|
| 1,660,931 | 2/1928 | Mather et al. . |
| 1,687,836 | 10/1928 | Hershey . |
| 1,738,699 | 12/1929 | Gillen . |
| 2,032,802 | 3/1936 | Hershey . |
| 3,629,818 | 12/1971 | Hirama et al. ............................. 70/252 |
| 3,802,531 | 4/1974 | Schiesterl .................................. 70/252 |
| 4,250,976 | 2/1981 | Mochida .................................... 70/252 |
| 4,773,241 | 9/1988 | Peitsmeier et al. ........................ 70/252 |
| 5,230,233 | 7/1993 | Shoji et al. ................................ 70/252 |

FOREIGN PATENT DOCUMENTS

| | | | |
|---|---|---|---|
| 2822132 | 11/1979 | Germany ................................. 70/422 |
| 3236190 | 4/1984 | Germany . | |

Primary Examiner—Steven N. Meyers
Assistant Examiner—Tuyet-Phuong Pham
Attorney, Agent, or Firm—Finnegan, Henderson, Farabow, Garrett & Dunner

[57] ABSTRACT

A steering lock apparatus of the type that a lock bar moving along the guide section of a lock body is protruded toward the steering shaft for locking, has a device for cooperating with the guide section to regulate the protrusion of the lock bar towards the steering shaft when the lock bar is accidentally released.

7 Claims, 10 Drawing Sheets

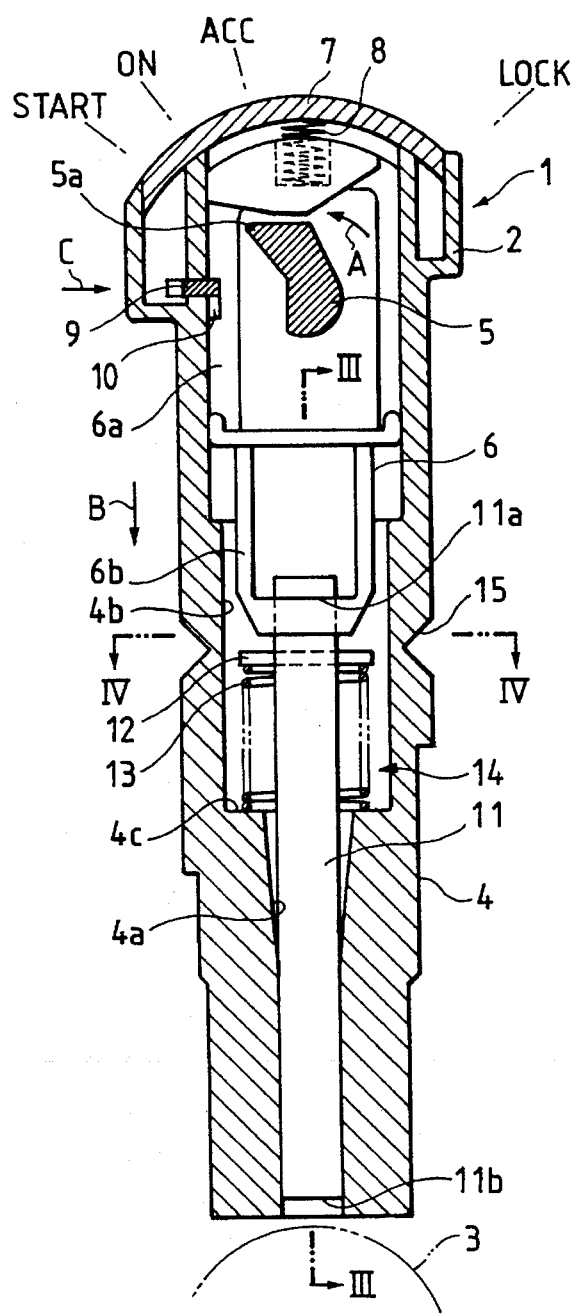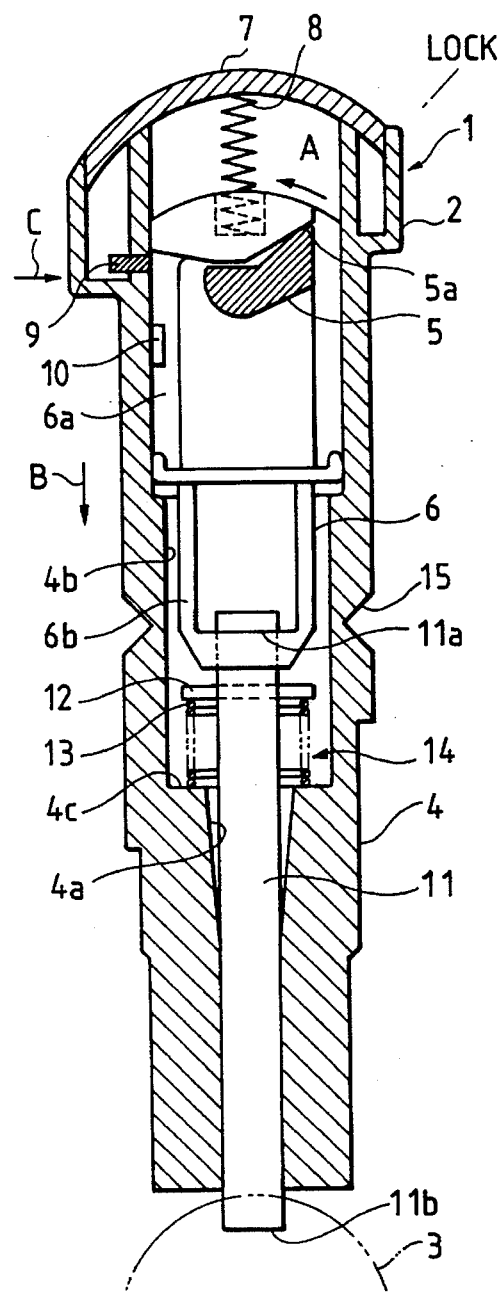

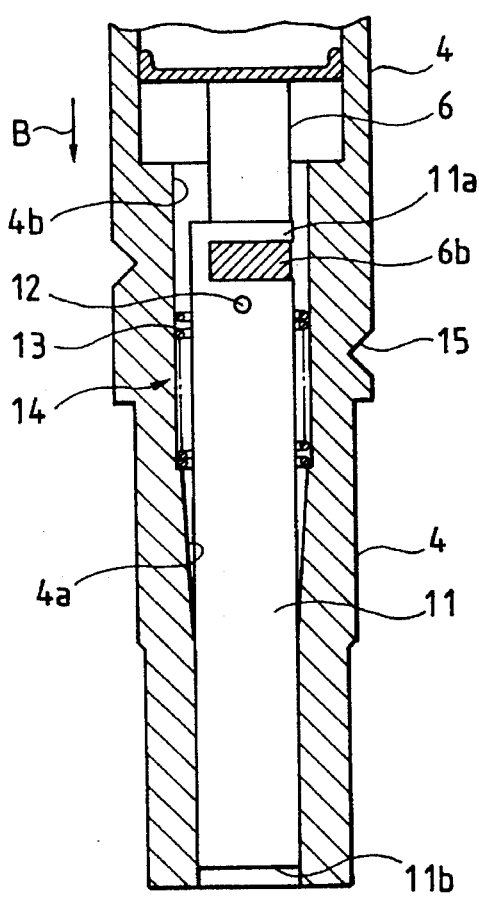
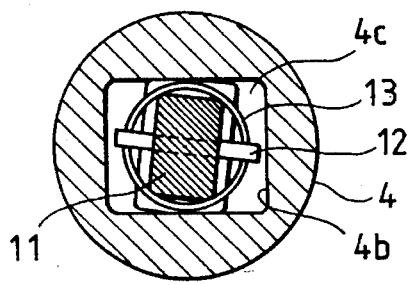
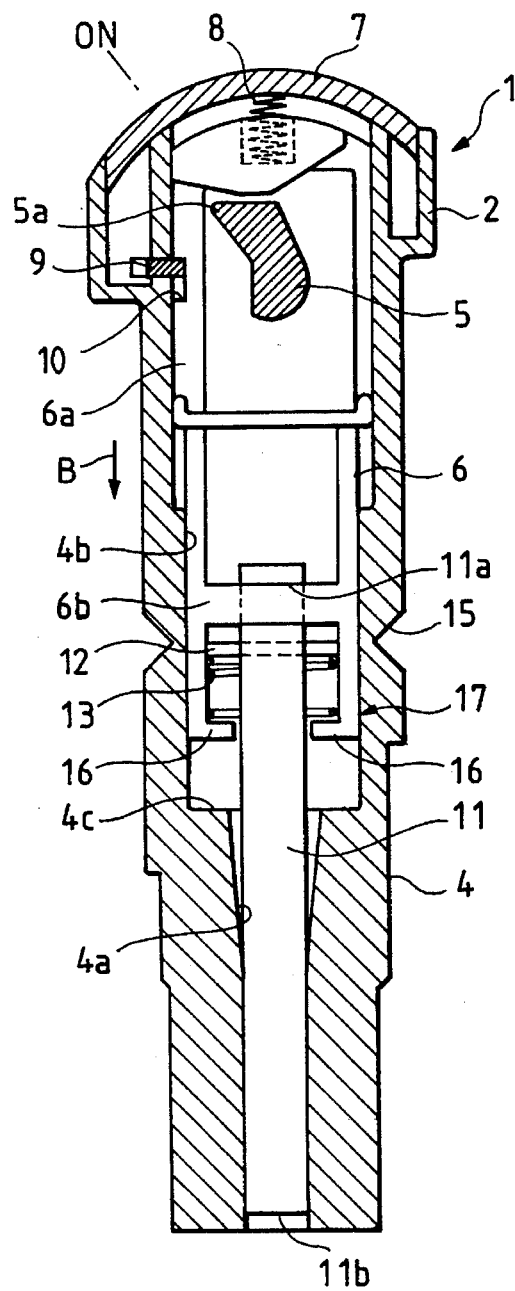

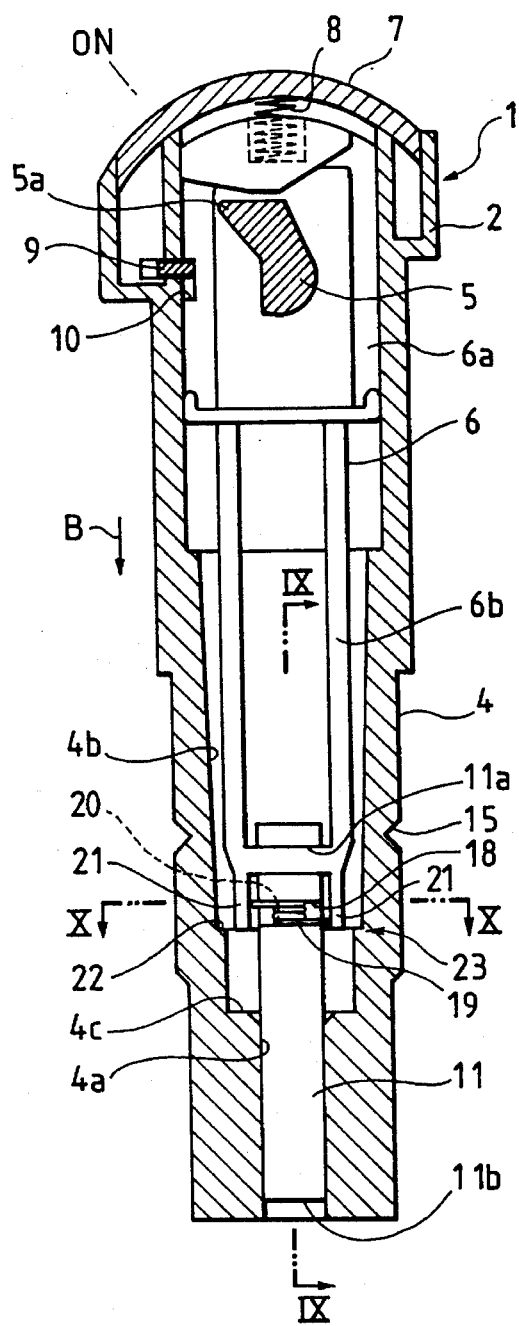
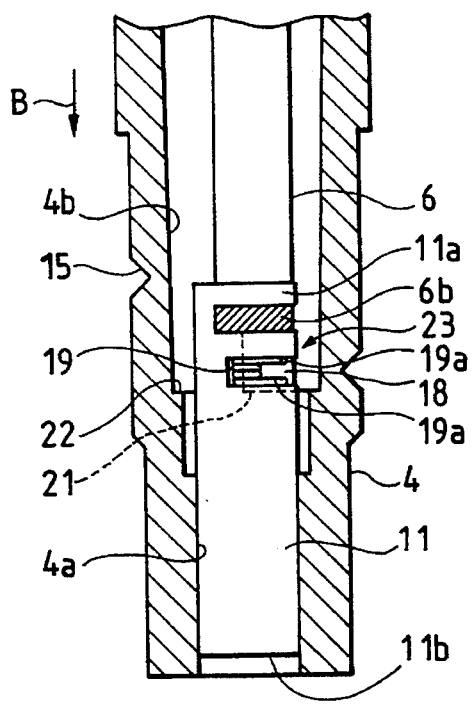
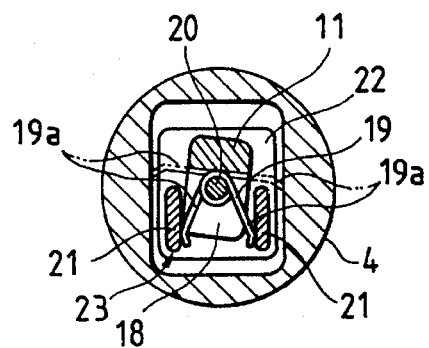

FIG. 11
FIG. 12
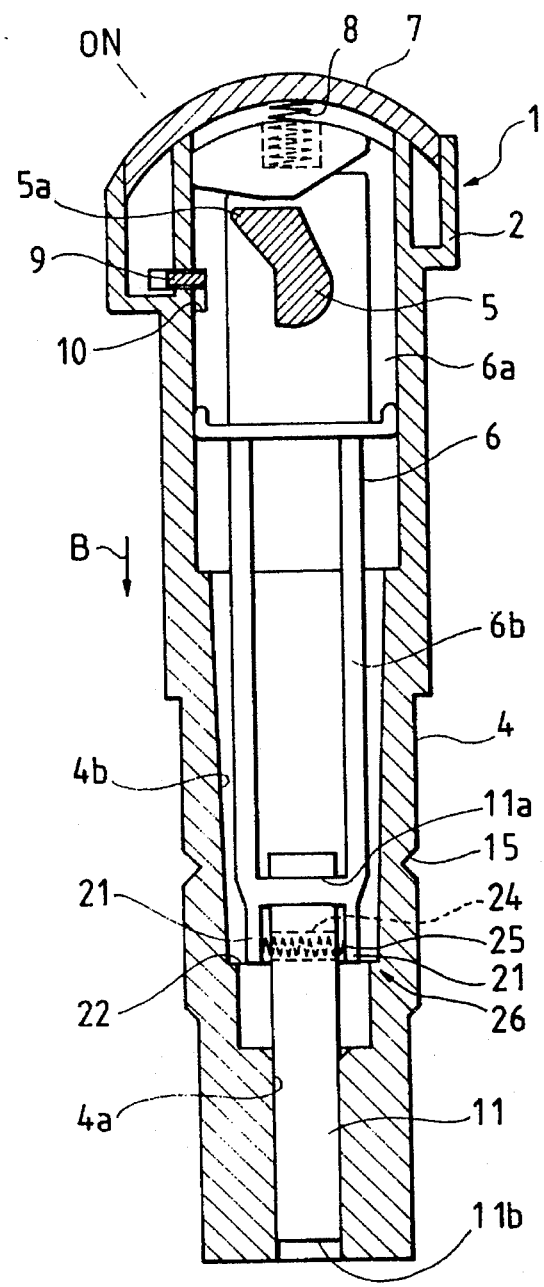
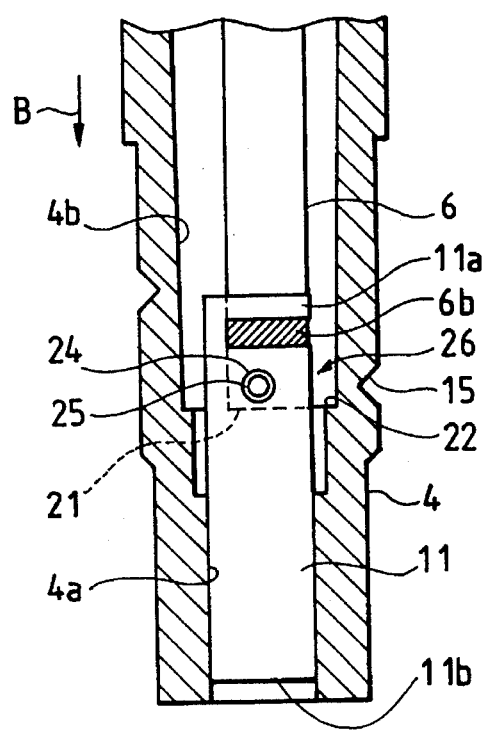

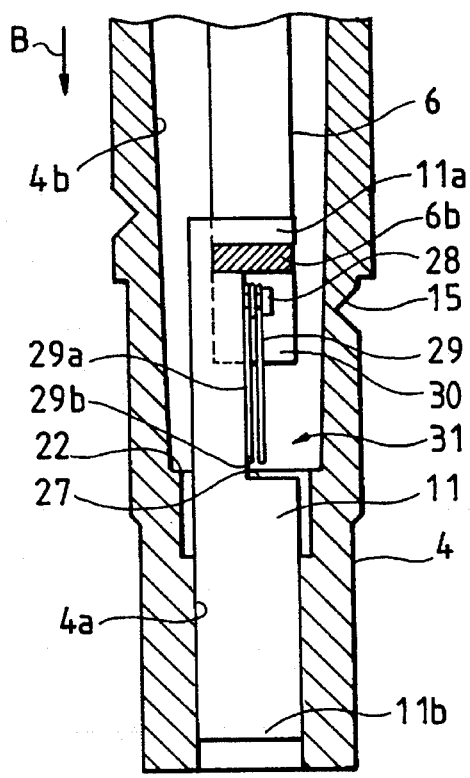
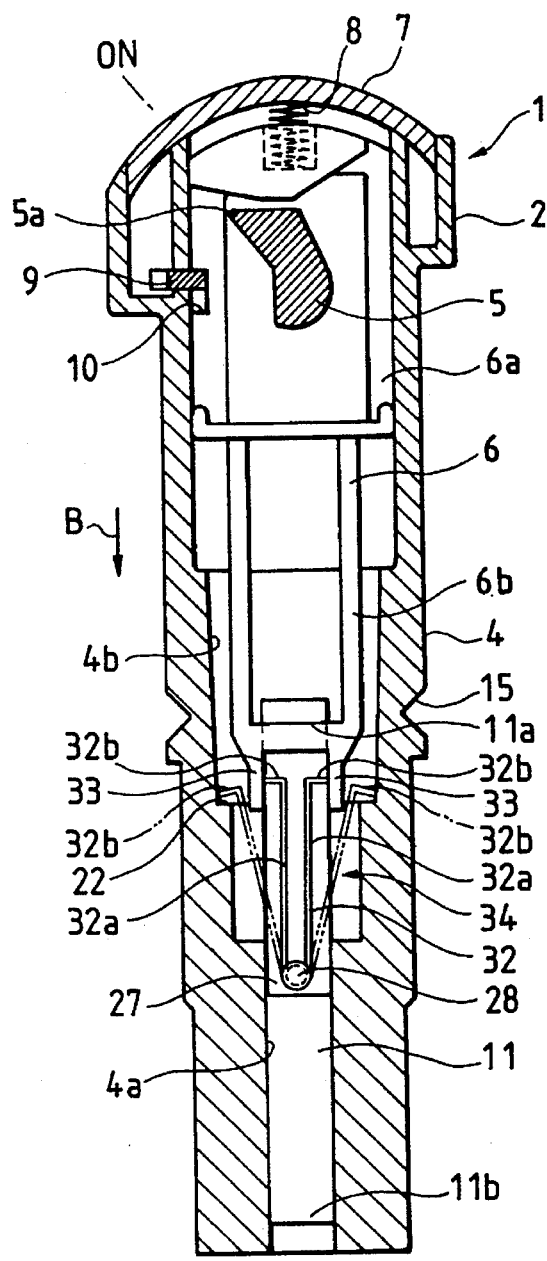
FIG. 15
FIG. 16

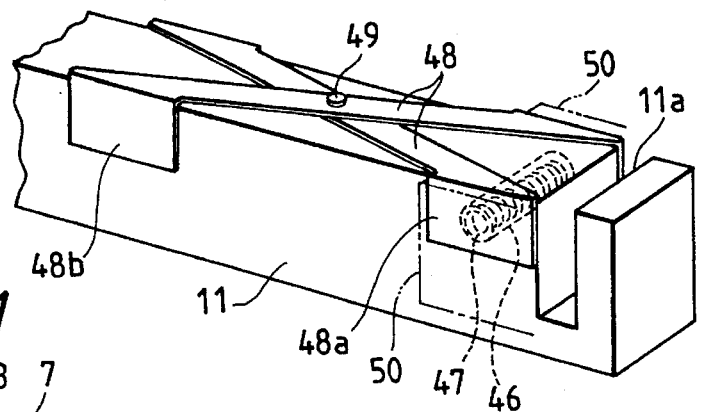
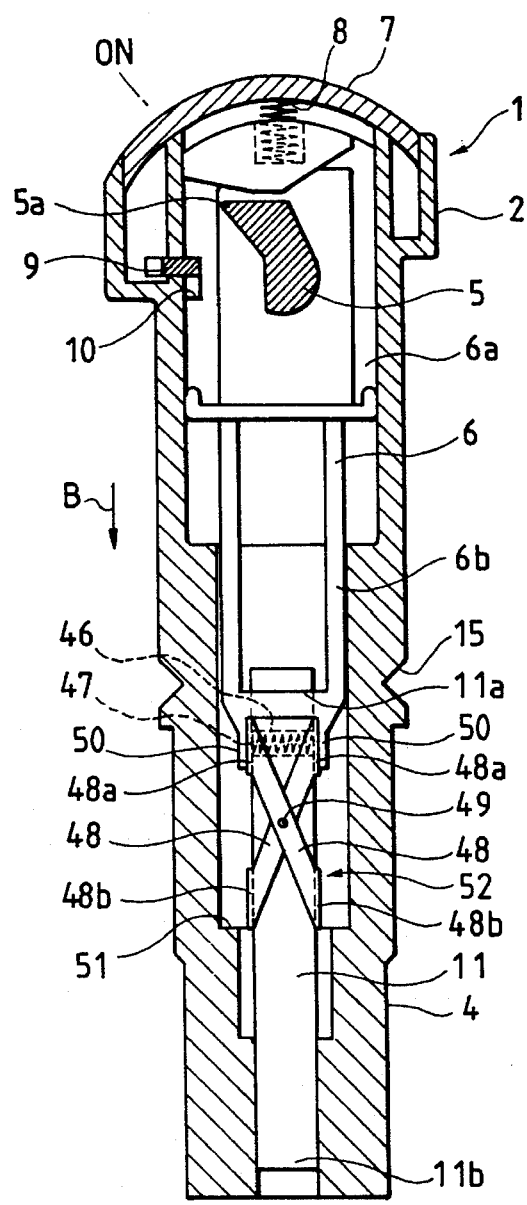
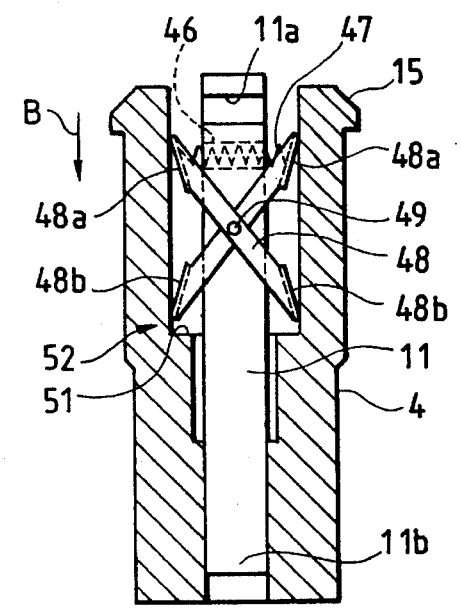

STEERING LOCK APPARATUS

BACKGROUND OF THE INVENTION

The present invention relates to a steering lock apparatus of the type that a lock bar moving along the guide section of a lock body is protruded toward the steering shaft for locking.

A conventional steering lock apparatus of this type is designed that the steering lock apparatus has a lock body which is coupled to the steering column of an automobile. The lock body is made up of a cylindrical body section which accommodates a key cylinder which is turned with the key, and a cylindrical guide section which is protruded from the body section toward the steering shaft.

A cam member is provided behind the key cylinder, so that it is turned by the key cylinder. The guide section has a lock stopper in the form of a frame which surrounds the cam member and is urged toward the steering shaft by a spring, and a lock bar one end portion of which is engaged with the lock stopper.

When the key cylinder is set at a locking position, the end portion of the lock bar is protruded toward the steering shaft to lock the steering shaft; i.e., to prevent the rotation of the steering shaft. When the key cylinder is turned from the locking position to an operating position, the cam member operates to move the lock stopper and the lock bar away from the steering shaft, so that the lock bar is disengaged from the steering shaft.

The conventional steering lock apparatus thus designed suffers from the following problem:

For instance, when the automobile equipped with the conventional steering lock apparatus is braked suddenly, the operator's knee may receive a great impact striking the guide section of the lock body hard.

There have been proposed a variety of means for decreasing the impact force which may be applied to the operator's knee in such a case. In one of the means, the guide section of the lock body is so designed that it is broken when an impact force greater than a predetermined value is applied thereto. That is, the guide section is broken to decrease the impact force.

However, the means gives rise to another problem. That is, when the guide section is broken, the lock bar is disengaged from the lock stopper, so that it is moved toward the steering shaft, thus accidentally locking the steering shaft.

SUMMARY OF THE INVENTION

An object of the present invention is to eliminate the above-described difficulty accompanying a conventional steering lock apparatus.

More specifically, an object of the invention is to provide a steering lock apparatus which is free from the difficulty that, when the lock bar is disengaged from the lock stopper, the steering shaft is accidentally locked by the lock bar.

The foregoing object and other objects of the invention have been achieved by the provision of a steering lock apparatus provides a lock body including a cylindrical body section which accommodates a key cylinder operated with a key, and a cylindrical guide section which is protruded from the body section toward a steering shaft; a cam member provided behind the key cylinder in such a manner that the cam member is turned by the key cylinder; a lock stopper which is movable along the guide section, the lock stopper being urged toward the steering shaft by an urging device, and moved as the cam member turns; a lock bar having one end portion which is engaged with the lock stopper so that the lock bar is moved together with the lock stopper, and the other end portion which, when the key cylinder is set at a locking position, is protruded toward the steering shaft to lock the steering shaft; and a regulating device for cooperating with the guide section to regulate the protrusion of the lock bar toward the steering shaft when the lock bar is disengaged from the lock stopper with the key cylinder set at an operating position.

In the steering lock apparatus, when the key cylinder is turned from the locking position to an operating position, the cam member moves the lock stopper and the lock bar away from the steering shaft against the urging force of the urging device to disengage the lock bar from the steering shaft.

In the case where, for instance when the automobile is braked suddenly, the guide section of the lock body is broken, and the lock bar is therefore disengaged from the lock stopper, the regulating device operates to regulate the protrusion of the lock bar toward the steering shaft. That is, the steering shaft is prevented from being accidentally locked by the lock bar.

The nature, utility and principle of the invention will be more clearly understood from the following detailed description and the appended claims when read in conjunction with the accompanying drawings, in which like parts are designated by like reference numerals or characters.

BRIEF DESCRIPTION OF THE DRAWINGS

In the accompanying drawings:

FIG. 1 is a sectional front view showing essential components of a steering lock apparatus, which constitutes a first embodiment of the present invention, with the steering shaft unlocked;

FIG. 2 is a sectional front view, showing the first embodiment, with the steering shaft locked.

FIG. 3 is a sectional view taken along line III—III in FIG. 1;

FIG. 4 is a sectional view taken along line IV—IV in FIG. 1;

FIG. 5 is a sectional front view, corresponding to FIG. 1, showing a second embodiment of the invention;

FIG. 8 is a sectional front view, corresponding to FIG. 1, showing a third embodiment of the invention;

FIG. 9 is a sectional view taken along line IX—IX in FIG. 8;

FIG. 10 is a sectional view taken along line X—X in FIG. 8;

FIG. 11 is a sectional front view, corresponding to FIG. 1, showing a fourth embodiment of the invention;

FIG. 12 is a sectional view, corresponding to FIG. 9 showing a part of the fourth embodiment;

FIG. 15 is a sectional view taken along line XV—XV in FIG. 14;

FIG. 16 is a sectional front view, corresponding to FIG. 1, showing a sixth embodiment of the invention;

FIG. 21 is a sectional front view, corresponding to FIG. 1, showing a ninth embodiment of the invention;

FIG. 22 is a perspective view showing regulating members mounted on a lock bar in the ninth embodiment;

FIG. 23 is a sectional view, corresponding to FIG. 7, for a description of the operation of a regulating device in the ninth embodiment.

DETAILED DESCRIPTION OF THE PREFERRED EMBODIMENTS

First Embodiment

Figure 6:
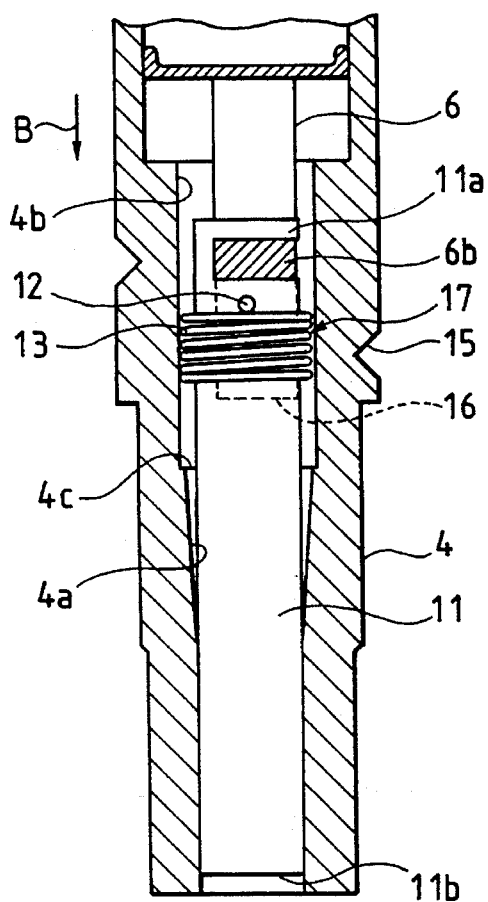
FIG. 6 is a sectional view, corresponding to FIG. 3, showing the second embodiment.

A steering lock apparatus, which constitutes a first embodiment of the present invention, will be described with reference to FIGS. 1 through 4.

The steering lock apparatus, as shown in FIGS. 1 and 2, has a lock body 1, which is coupled to the steering column in an automobile. The lock body 1 provides a body section 2 (extended perpendicular to the surface of the drawing) and a cylindrical guide section 4 which is extended from the body section 2 toward a steering shaft 3.

The body section 2 has a conventional key cylinder (not shown), which is turned with the key (the key cylinder being located on the back side of the drawing). Furthermore, a cam member 5 is provided at the position crossing the guide section 4 inside the body section 2. The cam member 5 is turned together with the key rotor (not shown) of the key cylinder. In addition, an ignition switch (not shown) is so provided (on the front side of the drawing) that it is operated through the shaft of the cam member 5.

As is well known in the art, when, after the key rotor is set at the LOCK position, the key is removed form the key rotor, the key cylinder is locked; and when the key rotor is turned with the key in the direction of the arrow A from the LOCK position to the ACC position, the ON position or the START position, the key cylinder is unlocked; i.e., the steering shaft is operable.

In the case of FIG. 1, the key rotor is turned to the ON position; that is, the key cylinder is unlocked, and the steering shaft is operable. In the case of FIG. 2, the key rotor is turned to the LOCK position, and the key is removed from the key rotor.

A lock stopper 6 is movably provided in the guide section 4. The lock stopper 6 is made up of a first frame 6a which surrounds the protrusion 5a of the cam member 5, and a second frame 6b which is provided on the steering shaft side of the first frame 6a in such a manner that the first frame 6a is integral with the second frame 6b.

An urging device, namely, a spring member 8 is interposed between the lock stopper 6 and a lid 7 to urge the lock stopper 6 toward the steering shaft 3 (or in the direction of the arrow B). Therefore, the lock stopper 6 is moved in the direction of the arrow B or in the opposite direction as the cam member 5 turns.

A locking lever 9 is extended along the key cylinder in such a manner that it its swingable in the body section 2. As is well known in the art, the locking lever 9 is swung as the key is inserted into and removed from the key rotor of the key cylinder. When the key is held inserted into the key rotor, the locking lever 9 is urged (in the direction of the arrow C) to abut against the first frame 6a of the lock stopper 6; and when, after the key rotor is turned to the LOCK position, the key is removed from the key rotor, the locking lever 9 is swung in the direction opposite to the direction of the arrow C.

An engaging groove 10 is formed in the side of the first frame 6a of the lock stopper 6. When the locking lever 9 is engaged with the engaging groove 10, the lock stopper 6 is held at the unlocking position as shown in FIG. 1.

One end portion of a lock bar 11, namely, an engaging portion 11a, as best shown in FIG. 3, is detachably engaged with the second frame 6b of the lock stopper 6 from side in a diameter direction thereof.

The lock bar 11 is in the form of a prism extended along the guide section 4. When the key cylinder is locked (as shown in FIG. 2), the other end portion 11b of the lock bar 11, protruding toward the steering shaft 3, is engaged with the steering shaft 3, thus inhibiting the rotation of the steering shaft 3.

A pin 12 penetrates the lock bar 11 near the engaging portion 11a as shown in FIG. 4. The guide section 4 is made up of a small diameter portion 4a, a large diameter portion 4b, and a step portion 4c between those portions 4a and 4b. A compression coil spring 13 is interposed between the step portion 4c and the aforementioned pin 12. The elastic force of the compression coil spring 13 is smaller than that of the above-described spring member 8.

The compression coil spring 13, the pin 12, and the step portion 4c of the guide section 4 form a regulating device 14 for regulating the protrusion of the lock bar 11 toward the steering shaft 3 (in the direction of the arrow B).

Further, a groove 15 is formed on an outer circumferential surface of the guide section 4 near a portion where the engaging portion 11a of the lock bar 11 is engaged with the second frame 6b of the lock stopper 6 when the lock stopper 6 and the lock bar 11 are moved at the unlocking position as shown in FIG. 1.

The steering lock apparatus designed as described above operates as follows:

When the key cylinder is in locking state (i.e., when the key is removed from the key rotor which has been turned to the LOCK position), the lock stopper 6 and the lock bar 11 are moved to their lock positions by the elastic force of the spring member 8 as shown in FIG. 2, and the other end portion 11b of the lock bar 11 is protruded toward the steering shaft 3, thus locking the steering shaft 3.

When, under this condition, the key rotor is turned in the direction of the arrow A to the START position with the key inserted thereinto, the ignition switch (not shown) is turned on to start the engine. Thereafter, the key is released. When the key is released in this way, the key rotor is automatically turned to the ON position, and held there.

In this operation, the lock stopper 6 and the lock bar 11 are moved by the cam protrusion 5a of the cam member 5 in the direction opposite to the direction of the arrow B against the elastic force of the spring member 8, so that the lock bar 11 is disengaged from the steering shaft 3. And when the engaging groove 10 of the lock stopper reaches the locking lever 9, the locking lever 9 is engaged with the engaging groove 10 as shown in FIG. 1, and the lock stopper 6 and the lock bar 11 are held at their unlocking positions.

For instance when the automobile is braked suddenly, the operator's knee may strikes the guide section 4 of the lock body 1 hard to break the guide section 4 at the groove 15, with the lock stopper 6 being disengaged from the lock bar 11. In this case, the breakage of the guide section 4 decreases the impact force applied to the operator's knee.

When the lock stopper 6 is disengaged from the lock bar 11 in the above-described manner, then the lock bar 11 is moved in the direction of the arrow B; that is, the end portion 11b is protruded toward the steering shaft 3 to accidentally lock the steering shaft 3.

However, the embodiment of the invention is free from this difficulty. That is, when the lock stopper 6 is disengaged from the lock bar 11, the elastic force of the compression coil spring 13 acts effectively to eliminate the above-described difficulty; that is, it prevents the movement of the lock bar 11 in the direction of the arrow B. Thus, in such a case, the steering shaft 3 is prevented from being accidentally locked by the lock bar.

Second Embodiment

Figure 7:
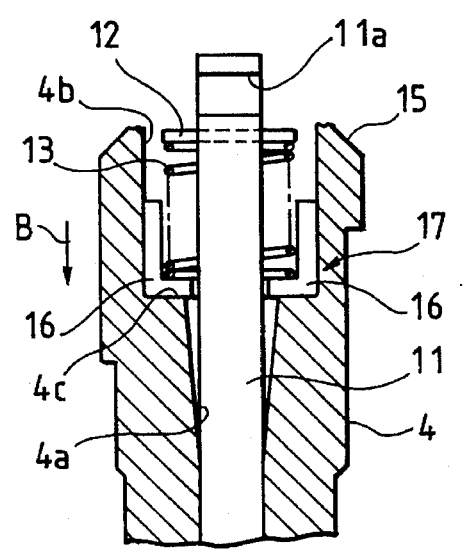
FIG. 7 is a sectional front view showing a lock bar disengaged from a lock stopper with a guide section being broken in the second embodiment.

Now, a second embodiment of the invention will be described with reference to FIGS. 5 through 7, in which parts corresponding functionally to those which have been described with reference to FIG. 1 through 4 (the first embodiment) are therefore designated by the same reference numerals or characters.

The second embodiment is different from the above-described first embodiment in that the second frame 6b of the lock stopper 6 has two spring receiving portions 16 and 16, and the compression coil spring 13 are interposed between the pin 12 of the lock bar 11 and the two spring receiving portions.

In the second embodiment, the compression coil spring 13, the pin 12, the step portion 4c of the guide section 4, and the spring receiving portions 16 form a regulating device 17 for regulating the protrusion of the lock bar 11 toward the steering shaft 13.

For instance when the operator's knee strikes the guide section 4 so that the guide section 4 is broken at the groove 15, the lock bar 11 is disengaged from the lock stopper 6 with the spring receiving portions 16 being broken. Even in this case, with the second embodiment, the steering shaft is prevented from being accidentally locked. That is, as shown in FIG. 7, the spring receiving portions 16 are abutted against the step portion 4c by the elastic force of the compression coil spring 13, to prevent the movement of the lock bar 11 in the direction of the arrow B, so that the steering shaft is prevented from being locked accidentally.

Third Embodiment

A third embodiment of the invention will be described with reference to FIGS. 8, 9 and 10.

In the third embodiment, a spring accommodating chamber 18 is formed in the lock bar 11 near the engaging portion 11a, and a torsion coil spring 19 is held through a pin 20 mounted in an axial direction of the lock bar 11 in the spring accommodating chamber 18, and the second frame 6b of the lock stopper has two spring receiving portions 21 and 21 which receive the two arms 19a and 19a of the torsion coil spring 19, respectively. Furthermore, the guide section 4 has an engaging step portion 22 in addition to the step portion 4a inside it.

In the third embodiment, the torsion coil spring 19 and the engaging step portion 22 form a regulating device 23 for regulating the protrusion of the lock bar 11 toward the steering shaft.

For instance when the operator's knee strikes the guide section 4 so that the guide section 4 is broken at the groove 15, the lock bar 11 may be disengaged from the lock stopper 6. In this case, the arms 19a and 19a of the torsion coil spring 19 are released from the spring receiving portions 21 and 21; that is, they are opened as indicated by the two-dot chain lines in FIG. 10, thus engaging with the engaging step portion 22 or the inner cylindrical surface of the guide section 4 to prevent the movement of the lock bar 11 in the direction of the arrow B. That is, the lock bar 11 is prevented from being protruded toward the steering shaft 3; more specifically, the steering shaft 3 is prevented from being accidentally locked by the lock bar.

Fourth Embodiment

Figure 13:
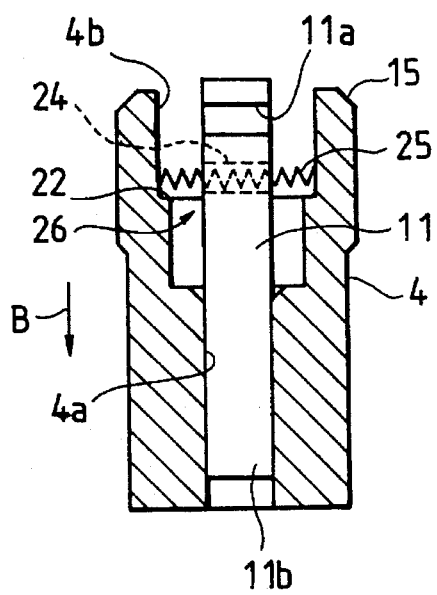
FIG. 13 is a sectional front view, corresponding to FIG. 7, for a description of the operation of a regulating device in the fourth embodiment.

Now, a fourth embodiment of the invention will be described with reference to FIGS. 11, 12 and 13.

The fourth embodiment is different from the above-described third embodiment in that a through-hole, namely, a spring accommodating chamber 24 is formed in the lock bar 11 near the engaging portion 11a in such a manner that the spring accommodating chamber 24 crosses the lock bar 11, a compressing coil spring 25 is held in the spring accommodating chamber 24 with both end portions of compressing coil spring 25 engaged with two spring receiving portions 21 and 21 of the lock stopper 6.

In the fourth embodiment, the compression coil spring 25, and the engaging step portion 22 form a regulating device 25 for regulating the protrusion of the lock bar 11 toward the steering shaft 3.

For instance when the operator's knee strikes the guide section 4, the guide section 4 is broken at the groove 15, with the lock bar 11 being disengaged from the lock stopper 6. In this case, the two end portions of the compression coil spring 25 are released from the spring receiving portions 21 and 21, so that, as shown in FIG. 13, the compression coil spring 25 is expanded to engage with the engaging step portion 22 or the inner cylindrical surface of the guide section 4, thus preventing the movement of the lock bar 11 in the direction of the arrow B. That is, the steering shaft 3 is prevented from being locked accidentally.

Fifth Embodiment

Figure 14:
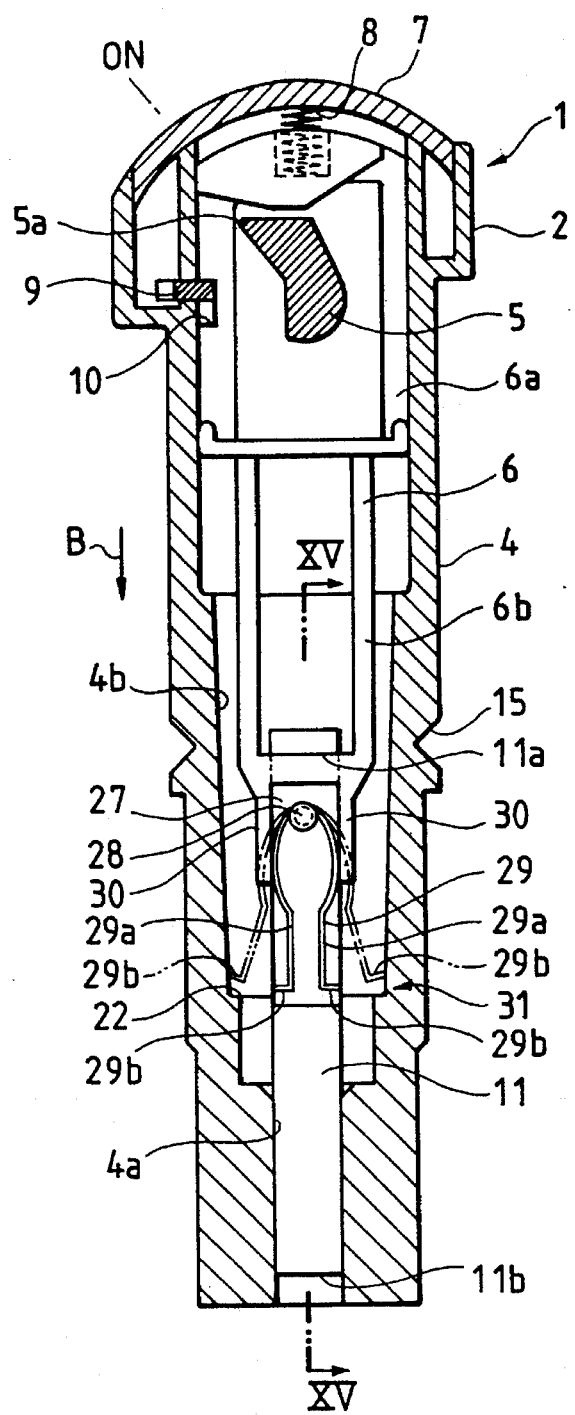
FIG. 14 is a sectional front view, corresponding to FIG. 1, showing a fifth embodiment of the invention.

A fifth embodiment of the invention will be described with reference to FIGS. 14 and 15.

In the fifth embodiment, a spring accommodating chamber 27 is formed in the lock bar 11 near the engaging end portion 11a, and a torsion coil spring 29 is held through a pin 28 in the spring accommodating chamber 27 in such a manner that the pin 28 crosses the lock bar 11, and the second frame 6b of the lock stopper has two spring receiving portions 30 and 30 which receive two arms 29a and 29a of the torsion coil spring 29.

In the fifth embodiment, the torsion coil spring 29, and the engaging step portion 22 form a regulating device 31 for regulating the protrusion of the lock bar 11 toward the steering shaft 3.

For instance when the operator's knee strikes the guide section 4, the guide section 4 is broken at the groove 15, with the lock bar 11 being disengaged from the lock stopper 6. In this case, the two arms 29a and 29a of the torsion coil spring 29 are released from the spring receiving portions 30 and 30, so that, the arms 29a and 29a are opened as indicated by the two-dot chain lines in FIG. 14 to cause their ends 29b and 29b to engage with the engaging step portion 22, thus preventing the movement of the lock bar 11 in the direction of the arrow B. That is, the steering shaft 3 is prevented from being locked accidentally.

Sixth Embodiment

Figure 17:
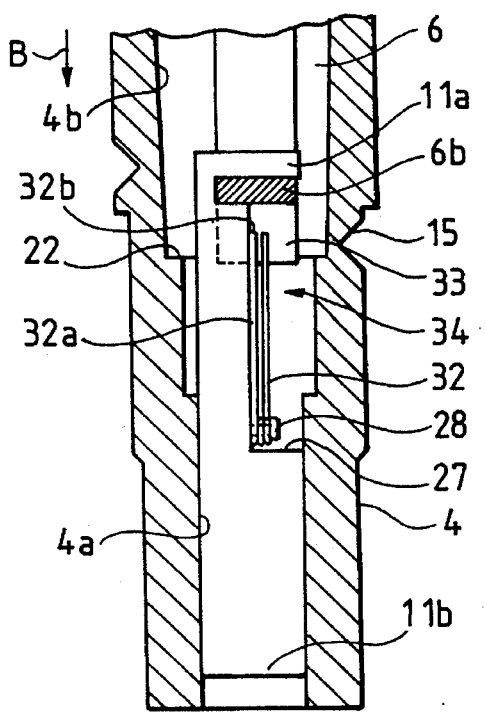
FIG. 17 is a sectional view, corresponding to FIG. 15, for a description of the operation of a regulating device in the sixth embodiment.

A sixth embodiment of the invention will be described with reference to FIGS. 16 and 17.

The sixth embodiment is different from the above-described fifth embodiment in that a torsion coil spring 32 is held through a pin 28 in the spring accommodating chamber 27 in such a manner that a coiled portion of the torsion coil spring 32 is on the side of the steering shaft 3, and the ends 32b and 32b of two arms 32a and 32a are held by two spring receiving portions 33 and 33 of the lock stopper 6.

In the sixth embodiment, the torsion coil spring 32, and the engaging step portion 22 form a regulating device 34 for regulating the protrusion of the lock lever 11 toward the steering shaft 3.

For instance when the operator's knee strikes the guide section 4, the guide section 4 is broken at the groove 15, with the lock bar 11 being disengaged from the lock stopper 6. In this case, the two arms 32a and 32a of the torsion coil spring 32 are released from the spring receiving portions 33 and 33, so that, the arms 32a and 32a are opened as indicated by the two-dot chain lines in FIG. 16 to cause their ends 32b and 32b to engage with the engaging step portion 22, thus preventing the movement of the lock bar 11 in the direction of the arrow B. That is, the steering shaft 3 is prevented from being locked accidentally.

Seventh Embodiment

Figure 18:
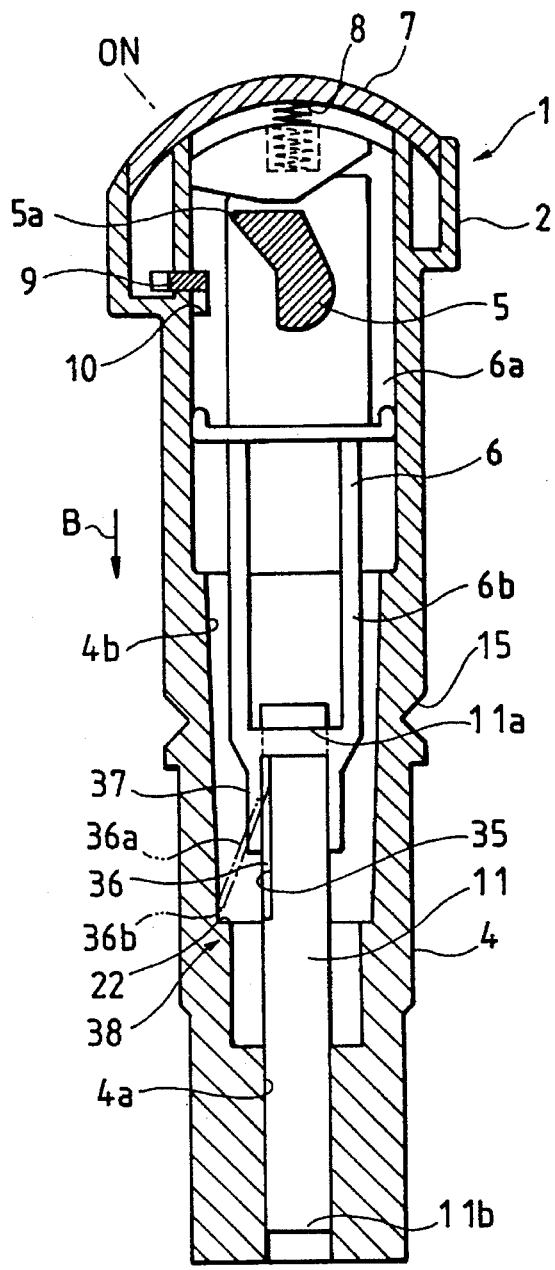
FIG. 18 is a sectional front view, corresponding to FIG. 1, showing a seventh embodiment of the invention.

A seventh embodiment of the invention will be described with reference to FIG. 18.

In the seventh embodiment, a shallow spring mounting recess 35 is formed in the lock bar 11, and a leaf spring 36, which bends slightly in free condition, is fixedly secured on the recess 35 through an upper end portion thereof. The second frame 6a of the lock stopper 6 has a spring retaining portion 37 which holds the leaf spring 36 straight.

For instance when the operator's knee strikes the guide section, the guide section 4 is broken at the groove 15, with the lock bar 11 being disengaged from the lock stopper 6. In this case, the leaf spring 36 is released from the spring retaining portion 37, so that a lower end portion 36a of the leaf spring 36 is swung outwardly as indicated by the two-dot chain lines in FIG. 18, to cause an end 36b of the lower end portion 36a to engage with the engaging step portion 22, thus preventing the movement of the lock bar 11 in the direction of the arrow B. That is, the steering shaft 3 is prevented from being accidentally locked by the lock bar 11.

Eighth Embodiment

Figure 19:
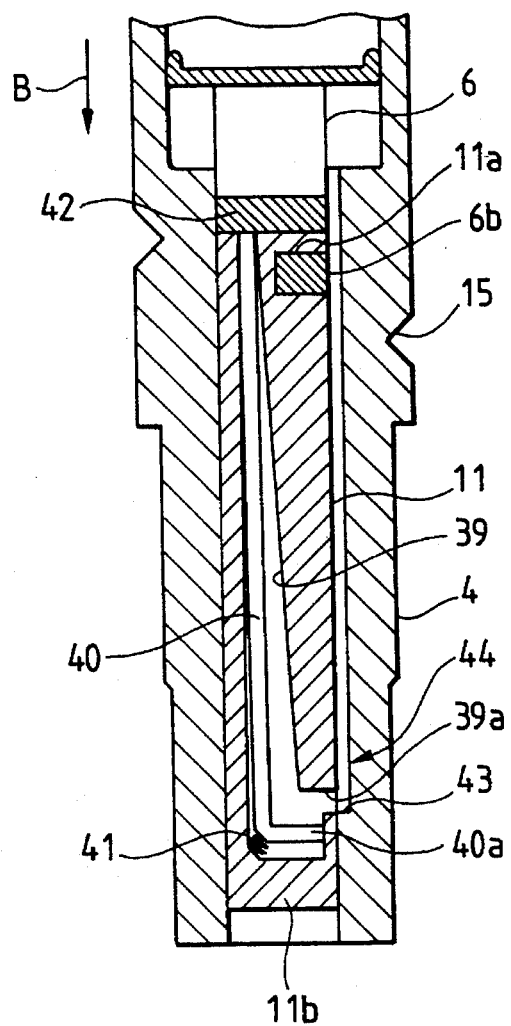
FIG. 19 is a sectional view showing essential components of an eighth embodiment of the invention, with the steering shaft locked.
Figure 20:
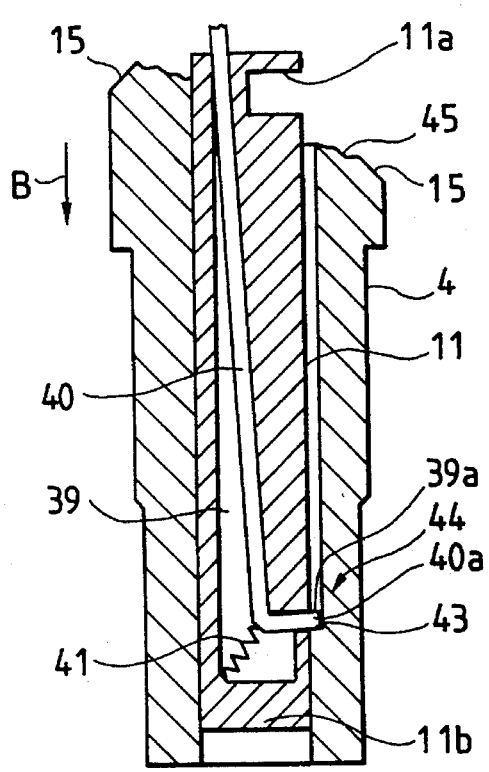
FIG. 20 is a sectional view showing a lock bar disengaged from a lock stopper with the guide section being broken in the eighth embodiment.

An eighth embodiment of the invention is as shown in FIGS. 19 and 20.

In the eighth embodiment, a rod accommodating chamber 39 is formed in the lock bar 11 in such a manner that it is extended vertically, and a substantially L-shaped rod 40 with an engaging end portion 40a is held in the rod accommodating chamber 39 together with a compression coil spring 41. More specifically, the rod 40 is pushed obliquely upwardly by the compression coil spring 41, and upward movement of the rod 40 is prevented with an upper end of the rod 40 abutted against a lock stopper retaining portion 42 from below.

The rod accommodating chamber 39 has an opening 39a which is opened sideward. The guide section 4 has an engaging step portion 43 in an inner cylindrical surface in correspondence to the opening 39a.

The rod 40, the compression coil spring 41, and the engaging step portion 43 form regulating member 44 for regulating the protrusion of the lock bar 11 toward the steering shaft 3.

For instance when the operator's knee strikes the guide section 4, the guide section 4 is broken at the groove 15, with the lock bar 11 being disengaged from the lock stopper 6. In this case, as shown in FIG. 20, the rod 40 is released from the retaining portion 42, so that it is moved upwardly by the elastic force of the compression coil spring 41 while an engaging end portion 40a is protruded through the opening 39a to engage with the engaging step portion 43, thus preventing the movement of the lock bar 11 in the direction of the arrow B, i.e., toward the steering shaft 3. Thus, the steering shaft 3 is prevented from being accidentally locked by the lock bar.

In the eighth embodiment, the engaging portion 40a of the rod 40 is located far from the broken part 45 originating from the groove 15. Therefore, even if the broken part 45 is somewhat shifted, the engaging portion 40a of the rod 40 is positively engaged with the engaging step portion 43.

Ninth Embodiment

A ninth embodiment of the invention will be described with reference to FIGS. 21, 22 and 23.

In the ninth embodiment, a spring accommodating chamber 46 is formed in the lock bar 11 near the engaging portion 11a in such a manner that the spring accommodating chamber penetrates said lock bar, and a compression coil spring 47 is disposed in the spring accommodating chamber 46. Two regulating members 48 and 48 are rotatably mounted on the lock bar 11 with a pin 49 in such a manner that they cross each other at the pin 49, and end portions 48a and 48a of the regulating members 48 and 48 receive both ends of the compression coil spring 47.

The second frame 6b of the hock stopper 6 has two retaining portions 50 and 50 which prevent the outward movement of the end portions 48a and 48a of the regulating members 48 and 48.

The guide section 4 has an engaging step portion 51 in the inner cylindrical surface in correspondence to the other end portions 48b and 48b of the regulating members 48 and 48.

The compression coil 47, the regulating members 48 and 48, and the engaging step portion 51 form a regulating device 52 for regulating the protrusion of the lock bar 11 toward the steering shaft 3.

For instance when the operator's knee strikes the guide section 4, the guide section 4 is broken at the groove 15, with the lock bar 11 being disengaged from the lock stopper 6. In this case, the regulating members 48 and 48 are released from the retaining portions 50 and 50. Therefore, as shown in FIG. 23, the regulating members 48 and 48 are opened, so that the lower end portions 48b and 48b are engaged with the engaging step portion 51, thus preventing the movement of the lock bar 11 in the direction of the arrow B, i.e., toward the steering shaft 3. Thus, the steering shaft 3 is prevented from being accidentally locked by the lock bar.

As was described above, the steering lock apparatus of the present invention provides the regulating device which, when the lock bar is disengaged from the lock stopper with the key cylinder set at an operating position, cooperates with the guide section to regulate the protrusion of the lock bar toward the steering shaft. Hence, in the case where, for instance when the automobile is braked suddenly, the lock bar is disengaged from the lock stopper, the steering shaft is prevented from being accidentally locked by the lock bar.

While there has been described in connection with the preferred embodiments of the present invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A steering lock apparatus comprising:
    a lock body including a cylindrical body section and a cylindrical guide section protruding from said body section toward a steering shaft;
    a cam member provided rotatably in said body section; a lock stopper provided movably along an inner surface of said guide section in accordance with a rotation of said cam member;
    urging means for urging said lock stopper toward said steering shaft;
    a lock bar having a first end portion engaged with said lock stopper for being moved together with said lock stopper, and a second end portion protruding toward said steering shaft for locking said steering shaft, said lock bar including a spring accommodating chamber near said first end portion; and
    regulating means for regulating said lock bar from protruding toward said steering shaft in cooperation with said guide section when said lock bar is disengaged from said lock stopper, said regulating means including an engaging step portion formed on said inner surface of said guide section and a torsion coil spring held in said spring accommodating chamber.

2. The steering lock apparatus of claim 1, further comprising a pin mounted in an axial direction of said lock bar in said spring accommodating chamber, wherein said torsion coil spring is held in said spring accommodating chamber through said pin.

3. The steering lock apparatus of claim 1, wherein said torsion coil spring includes arm portions, and said lock stopper includes spring receiving portions for receiving said arm portions of said torsion coil spring.

4. The steering lock apparatus of claim 1, wherein said guide section includes a groove formed on an outer surface of said guide section near a portion where said first end portion of said lock bar is engaged with said lock stopper when said steering shaft is not locked.

5. The steering lock apparatus of claim 1, wherein said urging means comprises a spring member.

6. The steering lock apparatus of claim 1, wherein said lock bar is disengaged from said steering shaft in such a manner that said cam member moves said lock stopper and said lock bar away from said steering shaft against the urging force of said urging means.

7. A steering lock apparatus comprising:
    a lock body including a cylindrical body section and a cylindrical guide section protruding from said body section toward a steering shaft;
    a cam member provided rotatably in said body section;
    a lock stopper provided movably along an inner surface of said guide section in accordance with a rotation of said cam member;
    urging means for urging said lock stopper toward said steering shaft;
    a lock bar having a first end portion engaged with said lock stopper for being moved together with said lock stopper, and a second end portion protruding toward said steering shaft for locking said steering shaft, said lock bar including a spring accommodating chamber near said first end portion in such a manner that said spring accommodating chamber crosses said lock bar; and
    regulating means for regulating said lock bar from protruding toward said steering shaft in cooperation with said guide section when said lock bar is disengaged from said lock stopper, said regulating means including an engaging step portion formed on said inner surface of said guide section and a compression coil spring held in said spring accommodating chamber; and
    said lock stopper including spring receiving portions for receiving both ends of said compression coil spring.

* * * * *